Aug. 12, 1958     J. A. MARQUARDT     2,847,562
CAR ACTUATED CIRCUIT CONTROLLER
Filed June 22, 1953
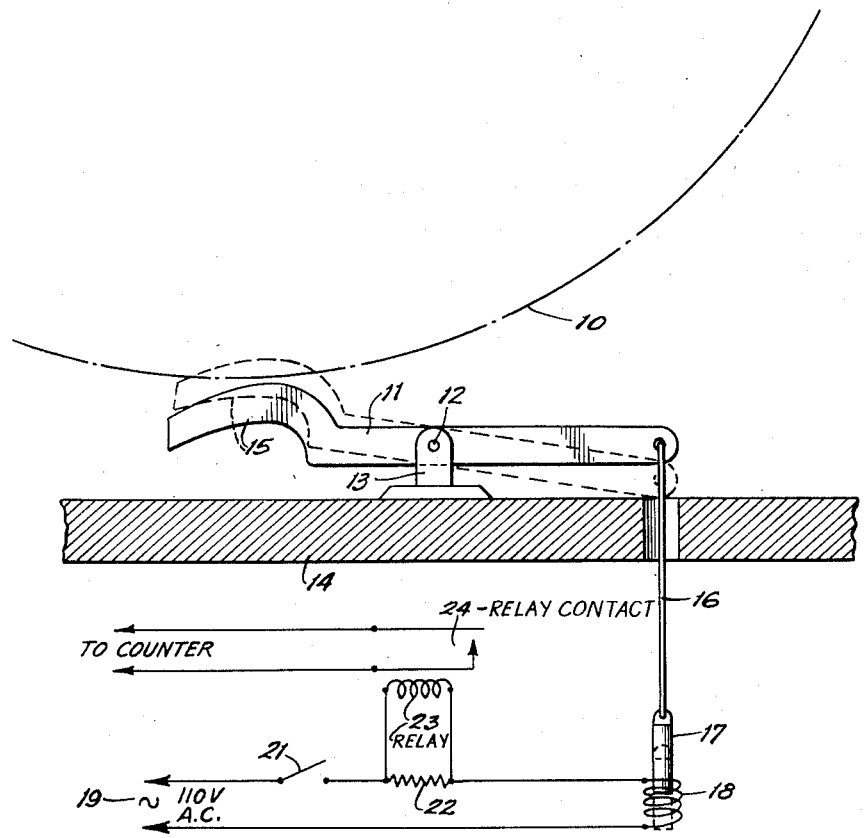
INVENTOR.
John Marquardt,
BY
Bair, Freeman & Molinare
ATTORNEYS.

United States Patent Office 2,847,562
Patented Aug. 12, 1958

2,847,562

CAR ACTUATED CIRCUIT CONTROLLER

John A. Marquardt, Elmhurst, Ill., assignor to Streeter-Amet Company, Chicago, Ill., a corporation of Illinois Application June 22, 1953, Serial No. 362,985

4 Claims. (Cl. 246—249)

This invention relates to track switches, and more particularly to an electrical counting or sensing mechanism actuated by a moving body such as the wheel of a railway car or the like.

In installations for counting moving bodies or for weighing bodies in motion, it is common to employ switches engaged by the moving bodies to operate counting or controlling circuits each time a moving body passes. For example, in counting or weighing railway cars in motion a switch is customarily mounted adjacent to the track and is engaged by the wheels on the cars as they pass to count the cars or to control the weighing mechanism.

Such switches are subjected to a large number of rapid and severe operations as they are engaged by the car wheels and tend to wear rapidly. The pressing of the switch contacts together rapidly and with a large degree of force causes contact wear and other moving parts of the mechanism, such as the return springs, are subjected to severe operating conditions. Therefore, such switches tend to become unreliable after a short period of use and must be replaced or repaired relatively frequently.

It is one of the objects of the present invention to provide a track switch in which the switching operation is performed without the use of contacts operated directly by the moving body.

Another object is to provide a track switch in which the operating mechanism lies out of the path of the moving body except when in actual use.

A further object is to provide a track switch in which an operating part is urged into the path of the moving body by a core forming a part of an electric solenoid and deflection of the core by engagement thereof with the moving body is sensed by measuring changes in the impedance of the coil.

The above and other objects and features of the invention will be more readily apparent from the following description when read in connection with the accompanying drawing in which the single figure is a diagrammatic view of a track switch embodying the invention.

The switch as shown is adapted to be mounted adjacent to a railway track to be engaged and operated by wheels of cars passing over the track either to count the cars or to control the operation of a weighing mechanism. Car wheels may travel in a path as indicated by the dot-dash lines 10 showing a wheel in position to actuate the switch and which may travel along a line lying in the plane of the paper.

The switch mechanism comprises a lever 11 pivoted intermediate its ends at 12 on posts 13 carried by a suitable base or mounting 14. At one end the lever is curved upward, as indicated at 15, to provide a part on the lever to be engaged by the car wheels as they pass. The end 15 of the lever is preferably heavier than the opposite end so that the lever normally tends to lie in the position shown with the end part 15 below and out of the path of travel of the wheels.

The opposite end of the lever is connected through a link 16 to the core 17 of a solenoid which includes a coil or winding 18. When the lever is in its horizontal full line position, the core will be elevated partially out of the coil as shown in full lines, but when the coil is energized, the core will be drawn down into the coil to turn the lever to its dotted line position. In this position the end part 15 is elevated so that it will be engaged by the wheels 10 as they pass.

The coil 18 is energized from a convenient source of electric current, indicated at 19, which may be connected to the coil through an on-off switch 21. When the switch is closed, the coil will be energized to rock the lever to the dotted line position shown so that the end 15 thereof will be engaged by wheels as they pass. When the coil is de-energized by opening the switch 21, the lever will move by gravity to the full line position shown so that passing wheels will not strike it, thereby minimizing wear.

When the coil is energized and the lever is elevated, the core 17 will be substantially centered in the coil and the coil will offer maximum impedance to flow of current therethrough. When a wheel strikes the end 15 of the lever to press it downward, the core 17 will be pulled partially out of the coil and the impedance of the coil will be temporarily reduced. Normally the wheels will pass fairly rapidly so that the core will be moved for only a very short interval of time to create current pulses in the energizing circuit of the coil.

In order to count such current pulses, a sensing means is provided in the energizing circuit to operate either a counting or control mechanism. As shown, this sensing means comprises a resistor 22 connected in series in the energizing circuit for the coil. A relay, including a coil 23, is connected in shunt across the resistor 22 so that each time the current in the coil energizing circuit rises, the increased current through the resistor 22 will increase the voltage drop, thereby increasing the voltage applied to the relay coil 23. The relay may include a switch 24 which is normally open and which will be closed each time the voltage on the relay coil 23 is increased. The switch 24 may be connected to a counter to count the pulses produced by passage of the wheels or may be connected in a control mechanism to control a weighing apparatus for weighing the cars.

It will be noted that the present apparatus avoids the necessity for springs which might wear or break under the constant pounding of the wheels and utilizes the same solenoid to function both as a spring and as a switch-actuating mechanism. Furthermore, when it is not desired to utilize the apparatus for counting or control operations, the operating lever will swing to a position in which it is not engaged by the wheels so that wear thereon will be minimized.

While one embodiment of the invention has been shown and described in detail, it will be understood that this is illustrative only and is not to be taken as a definition of the scope of the invention, reference being had for this purpose to the appended claims.

What is claimed is:

1. A track switch comprising a lever pivoted on a horizontal axis adjacent to the path of travel of a moving body and balanced so that one of its ends normally drops by gravity to a position below said path, said one end of the lever being adapted to be raised into said path to be engaged and deflected by a moving body, an electric coil, a core movable in the coil and connected to the other end of the lever, an energizing circuit for the coil connecting it to a source of alternating current, flux in the coil moving the core downward therein to raise said one end of the lever into said path when the coil is energized, and sensing means in the energizing circuit operable when the coil is energized to detect changes of impedance in the coil when the core is raised in the coil due to engagement of a moving body with said one end of the lever.

2. A track switch comprising a member movably mounted adjacent to the path of travel of a moving body and having a part adapted to project into the path of the moving body whereby the member will be moved when it is engaged by the moving body, a stationary electric coil, a core movable in the coil and connected to the member, the coil when energized moving the core in a direction to move said part on the member into said path so that a body moving in said path will engage said part and move the member and the core in the other direction, an energizing circuit for the coil connecting it to a source of alternating current, and sensing means in the energizing circuit operable when the coil is energized to detect differences in impedance in the coil when the core is shifted in the coil by movement of the member when it is engaged and moved by the moving body.

3. A track switch comprising a member mounted adjacent to the path of travel of a moving body and including a vertically movable part mounted for movement upward into said path in a position to be engaged and moved downward by the moving body, said member normally lying below the path of the moving body, an electric coil, a movable core in the coil connected to the member, the coil when energized moving the core in a direction to move said part upward into said path so that a body moving in said path will engage said part and move it downward thereby moving the core in the other direction, an energizing circuit for the coil connecting it to a source of alternating current, and sensing means in the energizing circuit operable when the core is energized to detect differences in the impedance of the coil when the core is shifted in the coil by engagement of a moving body with said part.

4. A track switch comprising a member mounted adjacent to the path of travel of a moving body and including a vertically movable part mounted for movement upward into said path to be engaged and moved downward by the moving body, said member normally lying below the path of the moving body, an electric coil, a movable core in the coil connected to the member, the coil when energized moving the core in a direction to move said part upward into said path so that a body moving in said path will engage said part and move it downward thereby moving the core in the other direction, an energizing circuit for the coil connecting it to a source of alternating current, a resistor in the energizing circuit, and a relay connected across the resistor to sense changes in the impedance of the coil when the coil is energized and the core is shifted therein by engagement of a moving body with said part.

References Cited in the file of this patent

UNITED STATES PATENTS

| | | |
|---|---|---|
| 283,152 | Scott | Aug. 14, 1883 |
| 821,801 | Hoeschen | May 29, 1906 |
| 1,647,954 | Bruna | Nov. 1, 1927 |
| 1,787,752 | McFarland | Jan. 6, 1931 |
| 2,340,213 | Ellsworth | Jan. 25, 1944 |
| 2,584,728 | Michel | Feb. 5, 1952 |